Jan. 1, 1946. J. A. WILDERMUTH 2,392,021
HEAT EXCHANGE APPARATUS
Filed Oct. 5, 1940 2 Sheets-Sheet 2

Fig. 2.

INVENTOR.
James A. Wildermuth
BY Norman C. H. Peletzke
Atty.

Patented Jan. 1, 1946

2,392,021

UNITED STATES PATENT OFFICE 2,392,021

HEAT EXCHANGE APPARATUS

James A. Wildermuth, Little Falls, N. Y., assignor to Cherry-Burrell Corporation, Wilmington, Del., a corporation Application October 5, 1940, Serial No. 359,839

20 Claims. (Cl. 257—2)

This invention relates to heat exchangers for fluids such as milk. More particularly it relates to the plate type of heat exchanger in which a plurality of relatively thin heat conducting or transfer plates is assembled in spaced face-to-face relation. The plates are assembled in a manner to provide a multiplicity of shallow fluid flow spaces or chambers which are separated one from another by heat transfer plates and associated gaskets and are inter-connected in predetermined order by gasketed fluid circulating passages. A heat exchanger adapted for various purposes may be provided by arranging or grouping and connecting the numerous flow spaces in a predetermined order.

Heat exchange fluids of different temperatures may be circulated through a given series of connected flow spaces in heat exchange relation with another heat exchange medium being circulated through a second series of connected flow spaces. In such a heat exchanger both fluids are always separated one from another by the various heat exchange plates and sealing gaskets associated therewith which define and enclose the individual flow spaces and connecting passages.

The plate type of heat exchanger is readily assemblable in a manner to form various types of heat exchange systems such, for example, as a regenerative system. In the pasteurization of milk the plate type of heat exchanger is frequently used as a regenerative heater. In the regenerative heat exchange system as used in a milk pasteurizer it is obviously desired to extract heat from the milk which has already been raised to pasturizing temperature and pasteurized, and to transfer such extracted heat to raw milk which is to be raised to the pasturizing temperature and pasteurized. Such a system is particularly efficient in conserving a substantial quantity of heat energy.

It is, however, imperative in the handling of food products, particularly dairy products, that raw unpasteurized milk be prevented from inter-mingling with pasteurized milk in order to avoid contamination of the latter. The elimination of such possible intermingling of raw milk with pasteurized milk would require that all of the plates bounding flow spaces be devoid of holes and that all of the flow spaces and the connecting passages through which the pasteurized milk and the raw milk flow in the regenerative heat exchanger be so sealed as to prevent any possible leakage of milk from the raw milk passage into the pasturized milk passage. In the conventional construction leak detection provisions are normally included in the gaskets to divert the leakage.

Obviously a condition as just described would be difficult to attain, especially in the event that a plate of the plate heat exchanger was punctured or developed minute openings through which milk may leak. In the event that a plate becomes defective and holes develop therein, or a gasket associated with the flow space bounded by that plate also develops a leak or the gaskets fail to seal, then the sub-atmospheric condition present in the flow space during normal operation would be changed to atmospheric. Leakage may then take place through the hole in the defective plate. The prevention of such possible leakage is one of the objects of this invention.

Leakage of pasteurized milk into the raw milk passage of a heat exchanger of the type contemplated by this invention would be more probable than leakage in the opposite direction since the pasteurized milk is normally under greater pressure than the raw milk while passing through the regenerative heater. However, such possible leakage of pasteurized milk into the raw milk passage is not particularly objectionable. Consequently it has become common practice to circulate the milk through the regenerative heat exchanger while being pasteurized in such a manner that the pasteurized milk is always under a greater pressure than the raw or unpasteurized milk. In such an arrangement any leakage of milk from one milk passage into another will always be from the high pressure side into the low pressure side, i. e., from the pasteurized milk passage into the raw or unpasteurized milk passage.

In order to secure an arrangement in which the pasteurized milk is circulated through the regenerative heater under greater pressure than the raw milk being drawn therethrough, the pasteurized milk is circulated under the full pump pressure of a circulating pump while the raw milk is drawn through the regenerative heater by the suction of the milk circulating pump. Obviously the raw milk will always be under sub-atmospheric pressure while being thus drawn through the regenerative heater and the pasteurized milk will be under super-atmospheric pressure while being forced through the heater.

The previously described circulating system and the resulting conditions will be present only after the system has been in operation for a sufficient length of time to fill all of the liquid passages. However, at the time of starting the pasteurization process, but before the pasteurized milk has filled the passages in the regenerative heater, a situation may develop upon the failure of the milk circulating pump in which leakage of raw milk from the raw milk passage into the empty pasteurized milk passage of the regenerative heater may occur. Such a situation may arise when the circulating pump stops and the flow of the raw milk being drawn through the regenerative heater under sub-atmospheric pressure is discontinued. The raw milk entrapped in the flow passages of the regenerative heater, upon coming to rest, may, due to an air leak which dissipates the sub-atmospheric condition, be under a static pressure therein due to its own weight which may be sufficient to cause a leakage of milk from the raw milk passage into the empty pasteurized milk passage at the point of any defect in a plate or gasket. Obviously such leakage would occur only when the pasteurized milk passage was empty and was not filled with fluid under pressure in excess of the pressure on the raw milk in the raw milk passage.

In order to provide the super-atmospheric pressure in the pasteurized milk passage to prevent the leakage of raw milk into the pasteurized milk passage, it is common practice at the time of starting the process to fill the flow spaces which comprise the pasteurized milk passage of the regenerative heater with hot water under a slightly super-atmospheric pressure before the raw milk is drawn through the regenerator. This procedure accomplishes the ultimate objective of preventing the leakage of raw milk into the pasteurized milk passage at the time of starting the pasteurizing process in the event that the milk circulating pump stops before the pasteurized milk enters the pasteurized milk passage in the regenerator. The introduction of water into the pasteurized milk passage incurs certain disadvantages, i. e.. the subsequent mixing of the water and the pasteurized milk for a short period of time during which the water is being expelled from the pasteurized milk passage of the regenerator by the incoming pasteurized milk.

It is, therefore, one of the prime objects of this invention to provide a heat exchanger of the plate type in which certain groups of individual fluid flow spaces defined by adjacent plates of the heat exchanger and associated gaskets are connected in such a manner as to form continuous separate passages for the raw milk and the pasteurized milk, respectively, and in which the individual flow spaces and connecting passages for the raw milk are so connected as to permit the complete drainage of the liquid therefrom without disconnecting the individual flow spaces and connecting passages, and to maintain the liquid under sub-atmospheric pressure while draining from the connected flow spaces forming the flow passage for the raw milk.

A further object of this invention is to provide a plate for a heat exchanger of the plate type in which the plate is provided with an automatic valve mechanism to regulate, direct or control the flow of fluid through a passage in the plate with which the valve is associated and also to regulate the flow of fluid in the heat exchanger of which the particular plate forms an integral part.

An additional object of this invention is to provide a heat exchanger in which the plurality of connected individual flow spaces which comprise the flow passage for one of the heat exchange media is connected both in series and in parallel and in which the series or parallel flow of the fluid through the plurality of individual flow spaces is automatically determined by an automatic valve responsive to the direction of the flow of the fluid.

A still further object of the present invention is to provide a fluid circulating system in the improved type of heat exchanger in which the air normally present in a certain by-pass connection is expelled from the by-pass connection and from the circulating system upon the commencement of the flow of the fluid through such connection, so as to prevent the introduction into the system of the air which normally would ultimately result in producing an air lock in the fluid circulating system, and to utilize the same provision which is used for the escape of the air from such connection to permit the free gravitational draining of liquid from the connection upon the discontinuance of the flow of liquid therethrough whereby the retention of a stagnant column of hot liquid within the flow system is prevented. Preventing the retention of such a stagnant column of liquid also prevents the multiplication of bacteria in such hot column of liquid which in the present embodiment of the invention consists of hot milk.

Another object of the present invention is to provide a plate for a plate heat exchanger combined with an automatically operated valve mechanism in which the valve mechanism is carried by the plate and operates in response to the pressure of the fluid upon the valve as it flows through the heat exchanger.

In a heat exchanger constructed in accordance with this invention, as illustrated in the drawings, the various objectives set forth above are readily attainable with the resulting advantage that the use of hot water in the pasteurized milk passage to develop a super-atmospheric pressure therein, as previously described, is not necessary even in the event that the circulating pump stops before the pasteurized milk passage of the regenerator has been filled with pasteurized milk. This advantage and other important advantages and objectives of the present invention, some of which have been referred to and which will become more apparent as the invention is better understood, are preferably accomplished as illustrated in the preferred embodiment of this invention in a plate heat exchanger. The organization and method of operation will be more readily apparent from the following description of the specific embodiment when read in connection with the accompanying drawings in which:

Referring to the drawings in which like numerals are used to identify like elements, 10 denotes a regenerative heat exchanger comprised of a plurality of juxtaposed slidably supported plates of substantially the type as shown in United States Patent No. 2,039,216 granted to H. Feldmeier and entitled "Plate heat exchanger." In the regenerative plate heat exchanger illustrated in this application the plates, which are sealed one against another by resilient gaskets, are so arranged upon the supports with the gaskets compressed sufficiently to permit the necessary relative movement to accommodate unbalanced pressures in adjacent closed spaces without permitting the sealed flow spaces to open and also so arranged as to provide what is commonly referred to as a two-pass fluid passage or flow system for both the pasteurized milk and the raw or unpasteurized milk.

Figure 2:
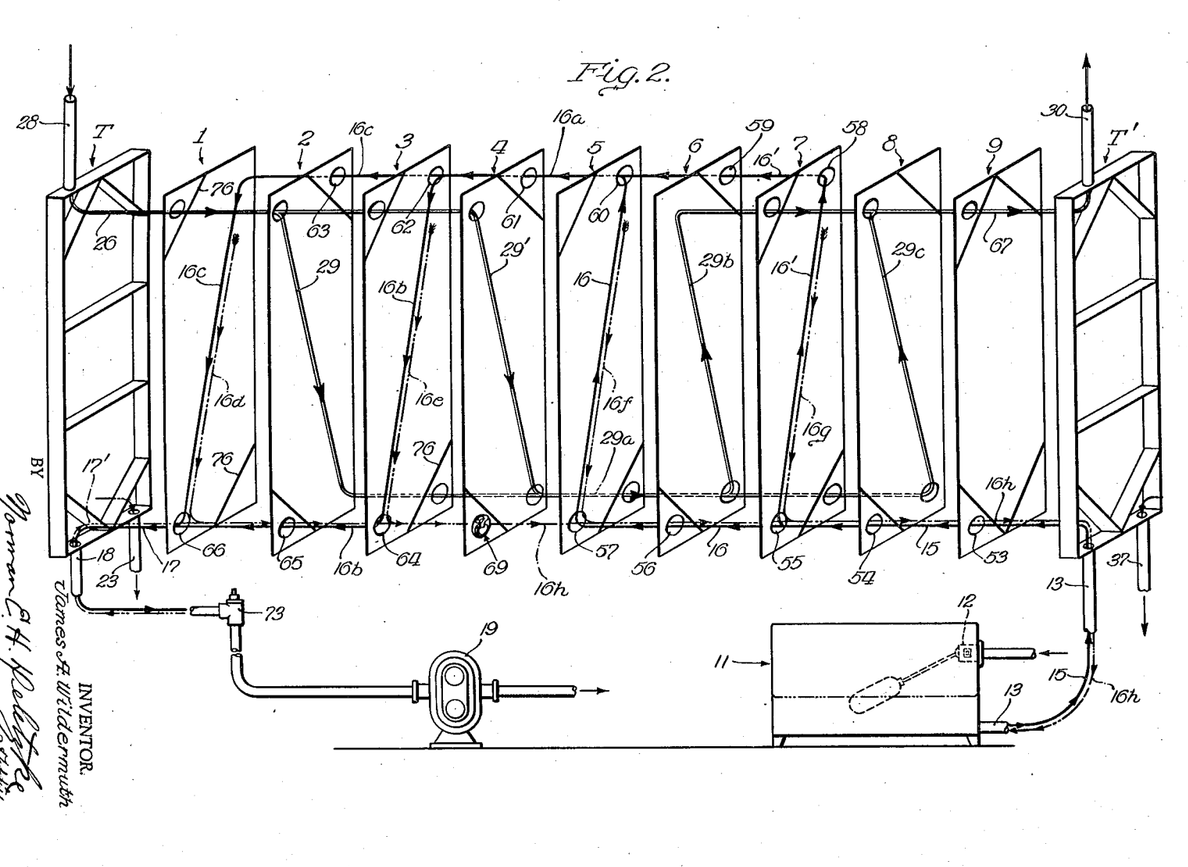
Figure 2 is a diagrammatic view showing a plurality of heat exchange plates together with the essential terminal plates to maintain them in operative position as indicated and assembled in such a manner as to comprise one particular type of regenerative fluid flow system.

The raw milk is supplied to the regenerative heat exchanger from a raw milk supply tank 11 which is provided with milk from any convenient raw milk supply through the float valve 12. The valve 12 is so adjusted as to maintain a maximum predetermined level of milk in the tank 11. The supply tank 11 is positioned at a lower elevation than the regenerative heat exchanger 10. The milk is drawn from tank 11 through conduit 13 to the lower portion of the regenerative heater 10 where it passes through a terminal or header element T' (see Figure 2) and thence through the flow spaces connected in a predetermined manner by the particular arrangement of the apertured and gasketed plates. A regenerative system for a plate heat exchanger and the flow system therein is schematically illustrated in Figure 2.

The raw milk, after leaving the conduit 13, flows in a single stream 15 through the terminal or header element T' and thence through one or more plates of the regenerative plate heat exchanger and then divides into two parallel upwardly flowing streams 16 and 16' in alternate flow spaces in the regenerative heat exchanger. Streams 16 and 16' join at their upper extremities to form stream 16a which flows leftwardly through gasketed openings in adjacent plates and then re-divides into downwardly flowing streams 16b and 16c which follow alternate flow spaces between adjacent plates to rejoin at their lower extremities as stream 17 which flows into the suction pipe 18 of the pump 19.

Figure 1:
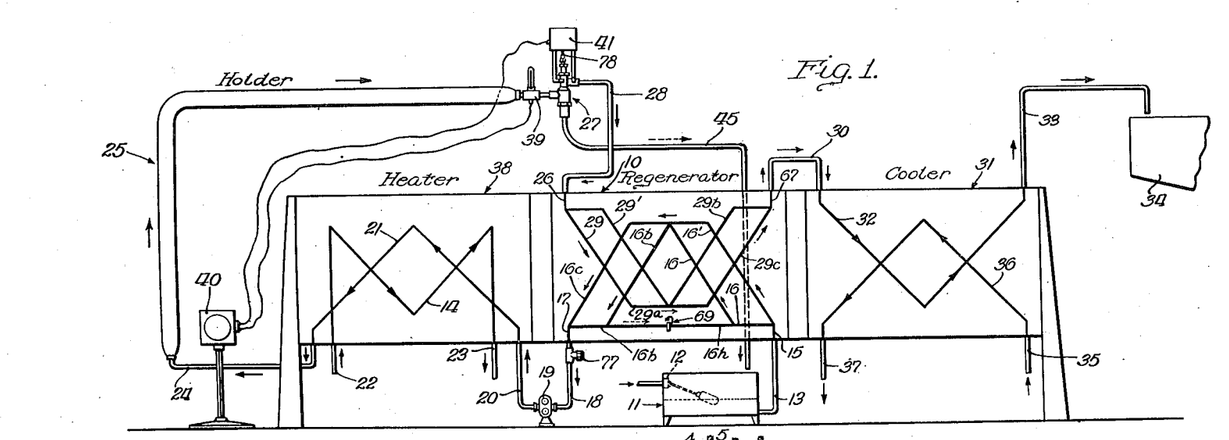
Figure 1 is a diagrammatic view showing the heat exchanger and schematically showing the fluid circulating system.

The raw milk is drawn through the regenerative heat exchanger into the suction or inlet pipe 18 of the milk circulating pump 19 by the suction of the pump and thence forced out through the discharge conduit 20 of the pump 19 into and through a plate type heater 38. In the heater 38 the preheated milk discharged from the pump 19 follows a course from right to left through connected flow spaces formed by adjacent plates, which flow line is schematically indicated by the line 21.

The heating medium enters the plate heat exchanger 38 at the left lower extremity thereof through the connection 22 and thence flows from left to right in opposite direction to the flow of the milk being heated thereby, as generally indicated in a schematic manner by the flow line 14. The heating medium is discharged from the heater 38 through the connection 23 at the lower righthand extremity of the heater.

The milk is discharged from the heater 38 through the discharge connection 24 and passes into the holder 25. The milk, after being held for a predetermined time to complete the pasteurization thereof, is discharged from the holder 25 through a flow diversion valve 27 positioned above the regenerative heater 10 into the conduit 28 which communicates with the admission port of the regenerative heater 10 at the upper lefthand corner thereof into which the pasteurized milk enters as a single stream 26.

The pasteurized milk enters the regenerative heater under super-atmospheric pressure as a single stream 26 which is subsequently divided into double and parallel flow streams which follow a downward course generally indicated by the lines 29 and 29' and which rejoin at their lower extremities as a single stream 29a. Stream 29a flows towards the right and then re-divides into two flow streams 29b and 29c flowing upwardly to rejoin at their upper extremities as a single stream 67 to be discharged from the regenerative heater into the discharge conduit 30. The pasteurized milk is conducted by conduit 30 into a plate type cooler 31 through which the pasteurized milk flows through a series of connected flow spaces following a general course from left to right through the cooler, as indicated by the schematic flow line 32. The cooled and pasteurized milk is discharged from the cooler 31 through a discharge conduit 33 into any convenient type of storage chamber 34.

The cooling medium, which is in heat exchange relation with the pasteurized milk while it passes through the cooler 31, enters the cooler through the connection 35 at the lower righthand extremity thereof and flows in counter-current direction through the cooler from right to left, as schematically indicated by the flow line 36, and is then discharged from the cooler through the connection 37 at the lower lefthand extremity thereof. The heating medium flowing through the heater 38 and the cooling medium flowing through the cooler 31 may obviously be supplied by any conventional arrangement, such as is common in the industry.

As just described and as clearly shown in Figure 1, the raw milk being drawn through the regenerative heat exchanger 10 is obviously under sub-atmospheric pressure in that it is being drawn through the regenerative heater by the suction created by the milk pump 19. The preheated milk which has thus been drawn through the regenerative heater 10 is, however, forced under super-atmospheric pressure by the pump 19 through the heater 38, the holder 25, the flow diversion valve 27, the pasteurized milk passages 29 of the regenerative heater 10, through the cooler 31 and thence through the pipe 33 into the storage tank 34.

While the pump 19 is in operation the pasteurized milk is under a pressure substantially in excess of the sub-atmospheric pressure under which the raw milk flows through the regenerator 10. In the event, however, that the pump 19 fails to operate or in the event that air leaks into the raw milk passage to dissipate the vacuum therein, then the raw milk in the raw milk passage 16 of the regenerator 10 and the pasteurized milk in the pasteurized milk passage 29 of the regenerator 10 will be under such pressures as result from the various static heads upon the pasteurized and unpasteurized milk due to the weight of the product entrapped in the mechanism as shown. In order to secure a greater static head on the pasteurized milk than could be developed in the raw milk, the flow diversion valve 27 and the conduit 28 through which the pasteurized milk enters the regenerative heater 10 are positioned above the regenerative heater to provide for such a static pressure head. The pressure head on the pasteurized milk in the passage 29 thus provided for, as just described, will always be in excess of the static pressure head on the raw milk in the flow passage 16 of the regenerative heater 10 when the pump 19 stops during the pasteurization process after the conduits and flow passage 29 have been filled with pasteurized milk.

Before the heated milk which has been passed into the holder 25 is discharged therefrom into the flow diversion valve 27 it passes over or through a thermostatic unit generally indicated by the numeral 39. The thermostatic unit 39 is responsive to the temperature of the milk flowing through the holder 25 and is operatively connected to a relay mechanism 40 which in turn is operatively connected with the actuating mechanism 41 carried by the flow diversion valve mechanism 27 for the actuation thereof.

Figure 5:
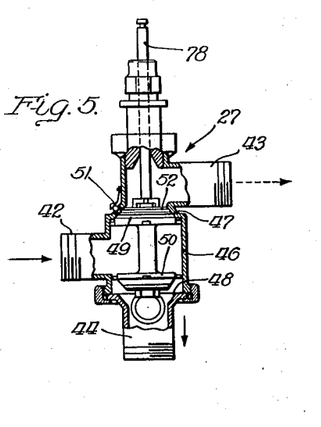
Figure 5 is an elevational view, partially in broken-away section, of a leak detector-equipped flow diversion valve shown in the fluid flow system of Figure 1.

The flow diversion valve 27 is so constructed that the liquid entering through the inlet 42 may be diverted into one of two discharge passages 43 and 44 depending upon the positioning of the valving mechanisms 49 and 50 within the valve 27. The position of the valves 49 and 50 with respect to their complementary valve seats 47 and 48, respectively, is determined by the valve actuating apparatus 41 which is indirectly responsive through the relay 40 to the thermal unit 39 positioned in the holding tube or holder mechanism 25.

If the heated milk, after passing through the holder 25, is of a predetermined temperature, the valve 27 is automatically set to discharge the pasteurized milk which enters the valve through the passage 42 from the passage 43 into the conduit 28. If, however, the heated milk which has passed through the holder 25 is not of a predetermined temperature then the actuating mechanism 41 responsive to the relay mechanism 40 and the thermal unit 39 positioned at the discharge portion of the holder 25 automatically adjust the valving mechanisms 49 and 50 of the valve 27 to divert the flow of the milk into the second valve discharge connection 44 from which the milk passes into the by-pass conduit 45 to be returned to the raw milk supply tank 11.

As clearly shown in Figure 1 of the drawings, the milk being returned from the flow diversion valve 27 through the conduit 45 to the supply tank 11 would fall through free air for a short distance into the supply tank 11. Such fall through free air results from the fact that the lower end of the conduit 45 does not extend into the milk contained in the supply tank 11, to provide a ready escape for the air out of the pipe 45 into the atmosphere upon the commencement of the diversion flow operation and also to avoid the air which is normally present in the pipe 45 prior to the diversion operation and immediately subsequent thereto from being taken into the fluid circulating system. If the air is not expelled from the fluid circulating system, and if the air is drawn from the by-pass 45 into the fluid circulating system, it will result in the development of an air lock within the system. The arrangement of the lower end of the pipe 45 above the level of the liquid in the tank 11 also permits the complete drainage of the liquid, i. e., milk, from the pipe 45 upon the completion of the diversion operation. The drainage of the milk from the pipe 45, in the manner just described, eliminates the danger of bacterial growth within a stagnant column of hot milk which would otherwise result if the milk could not readily drain from the pipe 45 upon the completion of the diversion flow.

The flow diversion valve 27 is of the general type illustrated in the United States Patent No. 1,859,504 granted to H. S. Fielder and entitled "Flow diversion valve," and in principle operates in the same general manner. Briefly stated, the flow diversion valve 27 consists of a housing 46, an upper valve seat 47, a lower valve seat 48 and a valve inlet 42 positioned intermediate said valve seats. The valve discharge connection 43 is positioned above the valve seat 47 and the valve discharge connection 44 is positioned below the valve seat 48. Double valves 49 and 50, which are complementary, respectively, to the valve seats 47 and 48, are mounted on a valve stem 78 intermediate the valve seats 47 and 48. The valve stem 78 is operatively connected with a valve actuating mechanism 41 which in turn is responsive to the relay 40 and the thermal unit 39.

During the operation of the valve 27, when the valves 49 and 50 are adjusted as shown in Figure 5 to cause the milk flowing through the valve to discharge through the outlet 44 which, as previously described, is the adjustment when the heated milk is not up to a predetermined temperature, a certain quantity of unpasteurized milk flowing through the valve 27 may leak past the valve 49 and mingle with the pasteurized milk in the valve discharge connection 43 thus contaminating the pasteurized milk. In order to prevent such leakage of unpasteurized milk into the pasteurized milk, the flow diversion valve 27 is provided with a leak detector or drainage valve generally indicated by the numeral 51. The leak detector or drainage valve 51 communicates with an annular groove 52 in the face of the valve 49 through an opening in the valve seat 47.

Figures 3, 4, 6:
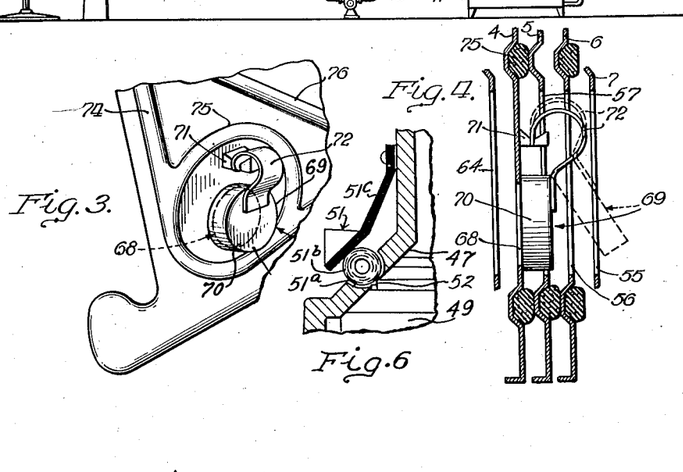
Figure 3 is a perspective view of a corner of one of the plates for the plate heat exchanger which has been provided with an automatic valve for controlling the flow of fluid through an opening in the plate.
Figure 4 is a fragmentary, vertical, sectional view taken through a corner of the plate and the valve shown in Figure 3 and several adjacent plates of the heat exchanger mounted in operative position with respect to one another.
Figure 6 is an elevational view, partially in section, of a broken-away section of the flow diversion valve shown in Figure 5 and illustrating particularly the leak detector or drainage feature of the valve.

The leak detector valve 51 consists of a generally spherical, apertured valve seat 51a positioned in the valve housing 46 so that the aperture of 51a is formed in the seat 47 for the valve 49. The valve seat 51a is also positioned to communicate with the annular groove 52 in the valve 49 when the valve 49 is seated against the seat 47. The substantially spherical valve element 51b is adapted to seat in the valve seat 51a when the valve 49 is withdrawn from valve seat 47 and valve 51b is held against seat 51a by a spring clip 51c. When the valve 49 engages seat 47 then the valve 51b is removed from seat 51a by the engagement of the face of valve 49 adjacent the groove 52 with the portion of the valve 51b, which normally protrudes through the aperture in the seat 51a beyond the face of the valve seat 47 when the valve 49 is removed from seat 47.

When the valve 49 engages the valve seat 47 the face of the valve 49 engages the valve element of the leak detector or drainage valve 51 so as to open the same, thereby permitting any milk which tends to percolate or leak through between the valve 49 and the valve seat 47 towards the discharge conduit 43 to enter the annular groove 52 in the face of the valve 49 and thence drain therefrom through the drain or leak detector valve 51. When the flow diversion valve 27 is so adjusted that the valve 49 is out of engagement with the valve seat 47 and the valve 50 is in engagement with the valve seat 48 then the leak detector or drainage valve 51 automatically seals and the pasteurized milk flowing through the flow diversion valve 27 into the discharge connection 43 will not tend to drain or leak through the leak detector or drainage valve 51.

An important aspect of the present invention, as illustrated in the drawings, relates to the control of the flow of raw milk through the regenerative heater 10. The particular manner of controlling such flow of raw milk may also be adapted to control the flow of the pasteurized milk through the regenerative heater 10. For the purpose of simplicity, however, the unique control mechanism has been illustrated only with respect to controlling the flow of the raw milk as shown in Figure 2.

Figure 2 schematically illustrates a specimen regenerative type plate heat exchanger consisting of nine plates numbered 1 to 9 inclusive and two end or thermal frames identified by the letters T and T'. The thermal frames T and T' are rigid, heavy constructions provided with bracing elements to help maintain the plates in their operative positions when the heat exchanger is assembled. The thermal frames are also provided with elements to engage the gaskets carried by the end plates 1 and 9 on their surfaces adjacent the terminals T and T' to form therewith sealed fluid flow passages to conduct the various fluids into and out of the individual flow spaces between the various heat exchange plates and the connecting passages formed by the cooperating gaskets superimposed about openings in the adjacent plates.

The various gaskets and cooperating elements have not been shown in detail as they are common in the art but generally these gaskets are of the type illustrated by the segmental drawing of Figure 3. In Figure 3 only one corner of the plate and the gasket element carried thereby which normally define the flow space and connecting passage for milk flowing through the regenerator is shown. In commercial constructions the fluid is introduced into the space between the plates through the gasketed openings in the corners of the plates which in turn communicate with inlet and discharge connections carried by the corresponding corners of the terminals T and T'.

In the regenerative heater which has been described in general terms previously, the flow of the raw milk which is withdrawn from the supply reservoir 11 is as follows:

The raw milk leaving the supply reservoir 11 passes through conduit 13, through the connecting opening in the lower lefthand corner of the terminal T', thence as a single stream 15 flows leftwardly through the complementary gasketed opening 53 in the lower lefthand corner of the plate 9, and thence through a complementary gasketed opening 54 in the lower lefthand corner of the plate 8 over to the lower lefthand corner of the plate 7. Stream 15 at this point divides into streams 16 and 16'.

Stream 16 continuing leftwardly passes on through the opening 55 in the lower lefthand corner of the plate 7 and thence through a complementary gasketed opening 56 in the lower lefthand corner of plate 6 over to the gasketed opening 57 in the lower lefthand corner of plate 5. Streams 16 and 16' at the openings 55 and 57 in the plates 7 and 5, respectively, turn upwardly and flow diagonally across these respective plates to the upper righthand corners thereof.

Stream 16' passes leftwardly through opening 58 in the upper righthand corner of plate 7, thence through the opening 59 in the upper righthand corner of plate 6 and thence over to the opening 60 in the upper righthand corner of the plate 5, joining stream 16 at that point to form therewith stream 16a. Stream 16a passes leftwardly through the opening 60, thence through the complementary opening 61 in the upper righthand corner of plate 4 and thence over to the opening 62 in the upper righthand corner of plate 3, at which point stream 16a re-divides into streams 16b and 16c. Stream 16c passes leftwardly through the opening 62, thence through the opening 63 in the upper righthand corner of plate 2 and thence over against the upper righthand corner of plate 1.

Streams 16c and 16b flow diagonally downwardly across plates 1 and 3, respectively, to the lower lefthand corners of these plates. Stream 16b passes leftwardly through the opening 64 in the lower lefthand corner of the plate 3, thence through the opening 65 in the lower lefthand corner of plate 2 and thence over to opening 66 in the lower lefthand corner of plate 1 where streams 16b and 16c join to form stream 17. Stream 17 passes through the opening 66 in the lower lefthand corner of plate 1 and thence through the discharge connection in the lower lefthand corner of the terminal T where it empties into the discharge conduit 18 which conducts the preheated milk into the circulating pump 19.

It will be apparent from the above description that the raw milk which enters the regenerative heat exchanger 10 as a single stream 15 is divided into two streams 16 and 16' which flow upwardly in parallel passages to be rejoined as stream 16a flowing through a single passage comprised of complementary gasketed openings 60 and 61 in adjacent plates. The stream 16a then re-divides into two streams 16b and 16c which flow downwardly to rejoin to form the discharge stream 17. The flow streams of raw milk which enter the regenerative heater as a single stream 15 and leave as a single stream 17, as just described, are represented in Figure 2 by the single solid lines. Upon inspection of this schematic flow chart it will be obvious that the raw milk, in passing from the terminal T' to the terminal T, flows through a raised passage at 16a formed by the co-acting gasketed openings 60 and 61.

The raw milk in streams 17, 16b and 16c which are located on one side of the restricted passage formed by the gasketed openings 60 and 61 would have a normal tendency to drain by gravity toward the conduit 18 while the raw milk in streams 15, 16, and 16' would normally tend to drain toward the supply connection 13. In a similar manner but in a reverse direction, i. e., from left to right, and in a reverse vertical direction, i. e., from top to bottom, and thence from bottom to top, the pasteurized milk which enters the terminal T through the connection 28 at the upper lefthand extremity thereof flows through a complementary or double series of single and double streams represented by the double solid lines 26, 29, 29', 29a, 29b, 29c and 67.

As described in the forepart of this application it is desirable to have an arrangement to obviate possible leakage from the raw milk passage into the pasteurized milk passage if the separating gaskets are slightly defective or worn and minute holes have developed in the plates of the heat exchanger. As also previously described, it is common practice today to prevent such leakage during normal pasteurizing operation by maintaining the pasteurized milk under a greater pressure than the pressure under which the raw milk is circulated through the regenerative heater 10. This is accomplished by drawing the raw milk through the regenerative heater under sub-atmospheric pressure and pumping the pasteurized milk through the regenerative heater under full pump pressure. When, however, the apparatus is first placed in operation this is impossible since the raw milk must first flow through the regenerator before it reaches the heat exchanger and holder in which the pasteurization is completed.

In order to overcome this difficulty in plate heat exchangers not equipped with the present invention, it is common practice in the industry to fill the pasteurized milk flow passages of the regenerative heater with hot water in place of the pasteurized milk, thereby maintaining a pressure differential between the hot water and the raw milk which will prevent the leakage of raw milk into the pasteurized milk passage. Obviously the use of hot water in the pasteurized milk passage is undesirable. As a means of avoiding this practice and also the possible accumulation of raw milk under a static pressure caused by its own weight in the raw milk passage in the event the circulating pump stops, an automatic control is provided whereby the raw milk is drained from the passage under sub-atmospheric pressure.

In general terms this control, whereby the raw milk is drained from the regenerator 10 under sub-atmospheric pressure, is secured by the provision of automatic means preferably associated with a valve which, as soon as the circulating pump stops and the suction caused thereby in the regenerative flow passage is expended, and the flow of the liquid toward the pump ceases, automatically operates to connect the various flow passages in the regenerator 10 which have previously been connected in series into parallel flow streams all emptying into a single channel. Through additional valve or air admission means air may, if desired, be admitted into the discharge conduit 18 preferably at an elevation above the elevation of the raw milk in the supply tank 11. By this combination of conditions a siphoning action is promptly set up to cause the complete draining of all of the raw milk from the regenerator 10 by the action of the siphon so produced.

This automatic rapid siphoning result is secured by the provision of a gasketed opening 68 in the lower lefthand corner of the plate 4 which is directly below the elevated restricted passage which forms a segment of the flow passage for the raw milk as it passes through the regenerative heater and the admission of air into the flow passage, as above described. The flow of fluid through the gasketed opening 68 in the lower lefthand corner of plate 4 is controlled by the automatically operated valve 69.

The valve opening 68 communicates with the adjacent openings 64 and 57, respectively, in the adjacent plates, thereby forming a continuous uninterrupted passage by the cooperating gasketed openings 53, 54, 55, 56, 57, 68, 64, 65 and 66, excepting as the passage is interrupted or controlled by the valve element 70 which is adapted to seal the opening 68 in the plate 4 which separates the two sets of streams of raw milk 16 and 16', and 16b and 16c. Upon inspection of Figure 2 it will be obvious that when the valve 69 is closed the streams 16 and 16' and the streams 16b and 16c are connected in a series flow and must pass through the elevated restricted openings formed by the gasketed passages 60 and 61 in the plates 4 and 5. However, when the valve 69 is open the streams 16, 16', 16b and 16c are placed in parallel flow, each emptying into the common passage formed by the complementary gasketed openings 53, 54, 55, etc., as above described.

In the event that the valve 69 should not function properly and fail to seal the opening 68, then the raw milk flowing through the regenerative heater while in normal operation would tend to follow the regular course of flow schematically illustrated by the lines 15, 16, 16', 16a, 16b and 16c and only a small proportion of the raw milk would probably flow through the restricted opening 68 which, under such circumstances, would not be completely closed by the valve 69. It is, of course, apparent that an improper operation of the valve 69 whereby the opening 68 could not be completely sealed would be the equivalent of the use of a continuously open small passage through the portion of the plate 4 in the general vicinity of the opening 68.

The milk entrapped in the flow passages 16, 16', 16a, 16b and 16c, upon the stopping of the pump 19 and the admission of air into the pipe 18 at a point above the level of the milk in the supply tank 11, would be connected in parallel by the connecting passage formed by the complementary gasketed openings 53, 54, 55, etc., as above described. The drainage procedure would however, in the modified construction having a restricted unvalved opening 68 be slow in that the opening 68 would of necessity have to be of a restricted nature so that while the machine was in normal operation the liquid would not all bypass through the opening 68.

The valve 69, as shown in Figure 4, is comprised of a valve plate 70 adapted to engage the face of the plate 4 and seal the opening 68. The valve plate 70 is suspended from a pivot block 71 on which it is suspended free to pivot by a suspension arm 72. In order to permit the free operation of the valve 69 and the passage of the liquid through the opening 68, the adjacent plate 5 is provided with the gasketed opening 57 whereby the pivoting of the valve 69, as illustrated by the dotted lines in Figure 4, is possible to complete the milk flow conduit formed by the complementary gasketed openings 53, 54, 55, etc.

Valve 69 is so constructed and its center of gravity is so positioned with respect to the point of pivoting on the pivot block 71 that when the mechanism is in operative position the valve plate 70 normally engages the adjacent surface of the plate 4 around the opening 68 to seal the same. The valve 69 is so mounted as to be closed by the normal flow of the raw milk while the pump 19 is in operation. However, upon stopping the pump 19 and the admission of air into discharge connection 18 through the manual air inlet valve 77 (see Figure 1) or through the manually operable air inlet valve 73 (see Figure 2), the raw milk in the flow passages 17 and 15 immediately tends to reverse its direction of flow because of the formation of the siphoning action resulting from the greater weight of the raw milk in the conduit 13, as compared with the weight of the milk in the conduit 18 above the air inlet openings 73 or 77. Such reverse flow of the raw milk in the regenerative heat exchanger is indicated by the single dotted lines 16d, 16e, 16f, 16g, 16h and 17'. The reverse flow of the milk, as represented by the stream 16h which passes through the opening 68, will open the valve 69 permitting the complete drainage into the supply tank 11 of all of the raw milk from all of the raw milk flow spaces and connecting passages in the regenerative heat exchanger 10.

As previously mentioned, the various openings through the plates in the regenerative heat exchanger 10, the heater 38 and the cooler 31 are of the type illustrated in the segmental drawings in Figures 3 and 4. In each instance the plate is provided with an encompassing gasket to seal the flow space between adjacent plates. This gasket also has separate elements adapted to seal the openings through the plates. As shown in Figure 3, the outer gasket is indicated by the numeral 74 while the gasket sealing a portion of the plate adjacent the opening therethrough is identified by the numeral 75.

In order to completely seal the flow space from the passages through the plate an additional gasket element 76 extending diagonally across the corner of the plate is provided. When it is desired to have the fluid passing through the opening in the corner of the plate flow through the flow space defined on one side by the particular plate and the gasket carried thereon, portions of the gaskets 75 and 76 are cut away to permit the free flow of the liquid from the opening in the corner of the plate over the surface of the plate.

As shown in Figure 4, the opening 68 is smaller in diameter than the diameter of the gasket 75 which encompasses the opening 68. In the adjacent plates 5, 6 and 7 openings of the normal size, i. e., 55, 56 and 57, are shown. These openings are substantially the size of the space bounded by the gasket 75. Obviously the purpose in reducing the size of the opening 68 below that of the openings 55 and 56 is to enable the positioning of the entire valve mechanism 69 within the space or passage defined by the coacting gaskets 75 and 76 and the openings 55, 56 and 57 within the adjacent plates 5, 6 and 7.

The previously described construction of a plate heat exchanger, the circulating system therefor and elements thereof enable the satisfactory commercial practice of a pasteurization process commonly referred to as a short time process with the assurance that the pasteurized milk as it passes through the regenerative heat exchanger will not be contaminated by raw milk which may leak from the raw milk passage into the pasteurized milk passage of the regenerative heater. This is accomplished without resorting to the use of a procedure necessitating the filling of the pasteurized milk passage with hot water at the time of the starting of the pasteurization process which always results in the dilution of a certain quantity of the pasteurized milk.

The arrangement of elements in a pasteurizing apparatus, as just described, also provides for the automatic recirculation of milk which has been heated but which has not been maintained at a predetermined temperature during the holding period. This, as set forth above, is accomplished by the use of the automatic flow diversion valve which is provided with leak detecting means to prevent the possible contamination of the pasteurized milk which has passed through the valve by raw milk passing through the valve when set in the diverting position due to possible leakage of raw milk past the valve sealing the opening of the pasteurized milk discharge port of the diverting valve.

The automatically operated by-pass valve in the regenerative heater proper assures the complete drainage of all the raw milk from the regenerative heater upon the stoppage of the milk circulating pump. If the pasteurized milk flow passages within the regenerative heater have not as yet been completely filled with pasteurized milk, the possible leakage of raw milk into these passages is prevented by the prompt drainage of the raw milk from the raw milk passages by a siphoning action which maintains the raw milk under subatmospheric pressure which is less than the pressure within the pasteurized milk flow passages even when they are not filled with pasteurized milk.

The drawings of the instant application illustrate the preferred embodiment of the invention. Obviously various modifications thereof may become apparent to those skilled in the art upon reviewing the invention herein disclosed. The invention is, however, not to be restricted except in so far as is necessary in view of the spirit of the appended claims.

The invention is hereby claimed as follows:

1. In combination, a regenerative fluid heating apparatus having a separate passage for the heated fluid and a separate passage for the fluid to be heated, said passage for the fluid to be heated being comprised of a plurality of individual flow spaces connected in series, means for supplying fluid to be heated to said regenerative apparatus, heating apparatus to which the fluid heated in said regenerative apparatus is supplied, holding apparatus to which the fluid heated in said heating apparatus is supplied, means including diversion valve means controlled by the temperature of the heated fluid, whereby the heated fluid is caused to be recirculated as fluid to be heated through the regenerative and heating apparatus if said heated fluid is below a predetermined temperature and is delivered to the regenerative apparatus as heated fluid if its temperature is equal to or greater than the predetermined temperature, said diversion valve means having drainage provisions for preventing leakage of fluid which is below a predetermined temperature from mixing with fluid which has previously passed through said valve means on its way to the regenerative apparatus as heated fluid, and means operable for connecting in parallel said individual flow spaces of said passage for fluid to be heated in said regenerative fluid heating apparatus upon the temporary cessation of flow of said fluid.

2. In combination, a regenerative fluid heating apparatus having a separate passage for the heated fluid and a separate passage for the fluid to be heated, said passage for the fluid to be heated being comprised of a plurality of individual flow spaces connected in series, means for supplying fluid to be heated to said regenerative apparatus, heating apparatus to which the fluid heated in said regenerative apparatus is supplied, holding apparatus to which the fluid heated in said heating apparatus is supplied, means including diversion valve means controlled by the temperature of the heated fluid, whereby the heated fluid is caused to be recirculated as fluid to be heated through the regenerative and heating apparatus if said heated fluid is below a predetermined temperature and is delivered to the regenerative apparatus as heated fluid if its temperature is equal to or greater than the predetermined temperature, said diversion valve means having drainage provisions for preventing leakage of fluid which is below a predetermined temperature from mixing with fluid which has previously passed through said valve means on its way to the regenerative apparatus as heated fluid, and means for automatically connecting in parallel said individual flow spaces of said passage for fluid to be heated in said regenerative fluid heating apparatus when the flow of the fluid to be heated in said flow spaces is interrupted.

3. In combination, a regenerative fluid heating apparatus having a separate passage for the heated fluid and a separate passage for the fluid to be heated, said passage for the fluid to be heated being comprised of a plurality of individual flow spaces connected in series, means for supplying fluid to be heated to said regenerative apparatus, heating apparatus to which the fluid heated in said regenerative apparatus is supplied, holding apparatus to which the fluid heated in said heating apparatus is supplied, means including diversion valve means controlled by the temperature of the heated fluid, whereby the heated fluid is caused to be recirculated as fluid to be heated through the regenerative and heating apparatus if said heated fluid is below a predetermined temperature and is delivered to the regenerative apparatus as heated fluid if its temperature is equal to or greater than the predetermined temperature, said diversion valve means having drainage provisions for preventing leakage of fluid which is below a predetermined temperature from mixing with fluid which has previously passed through said valve means on its way to the regenerative apparatus as heated fluid, means operable for connecting in parallel said individual flow spaces of said passages for fluid to be heated in said regenerative fluid heating apparatus upon the temporary cessation of flow of said fluid, and valve means for controlling the flow of fluid through said means connecting said flow spaces in parallel.

4. In combination, a regenerative fluid heating apparatus having a separate passage for the heated fluid and a separate passage for the fluid to be heated, said passage for the fluid to be heated being comprised of a plurality of individual flow spaces connected in series, means for supplying fluid to be heated to said regenerative apparatus, heating apparatus to which the fluid heated in said regenerative apparatus is supplied, holding apparatus to which the fluid heated in said heating apparatus is supplied, means including diversion valve means controlled by the temperature of the heated fluid, whereby the heated fluid is caused to be recirculated as fluid to be heated through the regenerative and heating apparatus if said heated fluid is below a predetermined temperature and is delivered to the regenerative apparatus as heated fluid if its temperature is equal to or greater than the predetermined temperature, said diversion valve means having drainage provisions for preventing leakage of fluid which is below a predetermined temperature from mixing with fluid which has previously passed through said valve means on its way to the regenerative apparatus as heated fluid, means for connecting in parallel said individual flow spaces of said passage for fluid to be heated in said regenerative fluid heating apparatus, and automatic valve means to direct the flow of fluid through said means connecting said flow spaces in parallel when the flow of fluid is interrupted.

5. A heat exchanger of the plate type including a plurality of vertically disposed plates defining fluid flow spaces connected in series for the normal flow of fluid in one direction, a by-pass in a plate connecting said series-connected flow spaces in parallel for the flow of fluid in the opposite direction, and valve means carried by said plate adapted to seal said by-pass when the fluid flows in the normal direction.

6. A heat exchanger of the plate type including a plurality of vertically disposed fluid flow spaces defined by plates and interposed gaskets and connected in series for the normal flow of fluid in one direction, a by-pass connecting said series-connected flow spaces in parallel for the normal flow of fluid in the opposite direction, and valve means movable with and supported upon one of said plates and positioned in said by-pass for regulating the flow of fluid therethrough, said valve means being normally sealed by the pressure of the fluid when flowing through said heat exchanger in said normal direction.

7. A heat exchanger of the plate type including a plurality of vertically disposed fluid flow spaces defined by plates and interposed gaskets and connected in series for the normal flow of fluid in one direction, a by-pass connecting said series-connected flow spaces in parallel for the normal flow of fluid in the opposite direction, and automatic valve means in said by-pass openable by the pressure of the fluid when said fluid tends to flow in the opposite direction to the flow of the fluid when flowing through said spaces in series, said valve means being supported upon one of said plates and being movable therewith.

8. In combination, a plate type heat exchanger having a plurality of fluid flow spaces connected in series, a by-pass connecting said flow spaces in parallel, a valve in said by-pass, a source of supply of fluid positioned at a lower elevation than said heat exchanger, a supply conduit for said heat exchanger communicating with said source of supply, an outlet conduit for said heat exchanger, means for effecting a flow of fluid from said source of supply through said heat exchanger and discharge conduit, and air inlet means in said discharge conduit at an elevation above the maximum fluid level in said source of supply, whereby when said means for effecting a flow of fluid through said heat exchanger becomes inoperative air may be admitted into said discharge conduit above the elevation of the fluid in said source of supply to cause a reversal of the direction of flow of fluid through said heat exchanger and the drainage of fluid from said heat exchanger into said source of supply.

9. In combination, a plate type heat exchanger having a plurality of fluid flow spaces connected in series and defined by adjacent juxtaposed plates normally sealed one to another, a by-pass connecting said flow spaces in parallel, a valve in said by-pass, a source of supply of fluid positioned at a lower elevation than said heat exchanger, a supply conduit for said heat exchanger communicating with said source of supply, an outlet conduit for said heat exchanger, and means for effecting a flow of fluid from said source of supply through said heat exchanger and discharge conduit, whereby, when said means for effecting a flow of fluid through said heat exchanger becomes inoperative due to the admission of air into at least one fluid flow space above the elevation of the fluid in said source of supply, and upon the breaking of the seal between two of the juxtaposed plates, a reversal of the direction of flow of fluid through said heat exchanger is brought about and the drainage of fluid from said heat exchanger into said source of supply takes place.

10. A plate heat exchanger of the type described comprising, in combination, vertically disposed gasketed plates defining flow spaces intermediate adjacent plates, passage means connecting a plurality of flow spaces in series in such a manner as to direct the flow of fluid in a vertical direction through said series-connected flow spaces when the normal flow of fluid is in one direction, and valve means carried by and movable with one of said plates and connecting all of said series-connected flow spaces at their lower portions when the normal flow of fluid is interrupted.

11. A plate heat exchanger of the type described comprising, in combination, vertically disposed gasketed plates defining flow spaces intermediate adjacent plates, means connecting a plurality of flow spaces in series in such a manner as to direct the flow of fluid in a vertical direction through said series-connected flow spaces when the fluid flow is in one direction, means connecting all of said series-connected flow spaces at their lower portions when the fluid flow is in the opposite direction, and valve means carried by one of said gasketed plates and being in said last mentioned means for controlling the flow of fluid therethrough.

12. In combination, a plate type heat exchanger having a plurality of fluid flow spaces connected in series, a by-pass connecting said flow spaces in parallel, a valve in said by-pass, a source of supply of fluid positioned at a lower elevation than said heat exchanger, a supply conduit for said heat exchanger communicating with said source of supply, an outlet conduit for said heat exchanger, means for effecting a flow of fluid from said source of supply through said heat exchanger and discharge conduit, and air inlet means in said discharge conduit at an elevation above the maximum fluid level in said source of supply, whereby when said means for effecting a flow of fluid through said heat exchanger becomes inoperative air may be admitted into said discharge conduit above the elevation of the fluid in said source of supply to cause a reversal of the direction of flow of fluid through said heat exchanger and the drainage of fluid from said heat exchanger into said source of supply, said valve in said by-pass being openable by the pressure of the fluid when tending to reverse its direction of flow.

13. In combination, a plate type heat exchanger having a plurality of fluid flow spaces connected in series and defined by adjacent juxtaposed plates normally sealed one to another, a by-pass connecting said flow spaces in parallel, a valve in said by-pass, a source of supply of fluid positioned at a lower elevation than said heat exchanger, a supply conduit for said heat exchanger communicating with said source of supply, an outlet conduit for said heat exchanger, and means for effecting a flow of fluid from said source of supply through said heat exchanger and discharge conduit, whereby, when said means for effecting a flow of fluid through said heat exchanger becomes inoperative due to the admission of air into at least one fluid flow space above the elevation of the fluid in said source of supply, and upon the breaking of the seal between two of said juxtaposed plates, a reversal of the direction of flow of fluid through said heat exchanger is brought about and the drainage of fluid from said heat exchanger into said source of supply takes place, said valve in said by-pass being openable by the pressure of the fluid when tending to reverse its direction of flow.

14. In an apparatus of the type described, separate fluid flow spaces defined by separable heat exchange plates sealed one to another, a communicating passage intermediate said separate fluid flow spaces, and valve means within said communicating passage for regulating the flow of fluid through said passage, said valve means being carried by and movable with one of said plates and being so constructed and arranged as to seal said passage when fluid flows through said flow spaces in one direction and to otherwise permit said passage to remain open when fluid flows through said spaces.

15. For use with a plate type of heat exchanger for attempering a flowing stream of fluid, a plate for said heat exchanger provided with a fluid passage therethrough, and valve means supported upon and hinged to said plate and associated with said passage for regulating the flow of fluid through said passage.

16. A regenerative heat exchanger including a series of fluid flow spaces defined by juxtaposed plates and interposed gaskets, open passage means connecting some of said flow spaces in series, passage means adapted to connect said last mentioned flow spaces in parallel, and automatic valve means supported upon one of said plates and associated with the passage in said last mentioned connecting means operable to permit fluid flow through said valve means upon the reversal in direction of the normal flow of fluid, during which normal flow of the valve means is sealed by the pressure of the flowing fluid.

17. A regenerative heat exchanger including a series of fluid flow spaces defined by juxtaposed plates and interposed gaskets, passage means connecting some of said flow spaces in series, passage means adapted to connect said last mentioned flow spaces in parallel, and automatic valve means carried by one of said plates and associated with the passage in said last mentioned connecting means, said valve means being responsive to the pressure on the fluid flowing through said last mentioned flow spaces, whereby the reversal in direction of the normal flow of fluid opens said valve means and the pressure of the fluid flowing in the normal direction closes said valve means.

18. In a heat exchanger of the plate type, a vertically disposed sinuous fluid flow passage defined by juxtaposed plates and interposed gaskets, means connecting the lower extremities of all of the sinuous flow passages, and automatic valve means carried by one of said plates in said connecting means for directing the flow of fluid therethrough when the normal direction of fluid flow through said passage is reversed, whereby all fluid may be drained from all of said flow passages.

19. A continuous heat treating device comprising, in combination, a container for fluid to be treated; means for supplying fluid thereto; a heat exchange device including a heating section, a cooling section and a regenerative section; holding mechanism; connections for conducting fluid from said container to the heating path of said regenerative section, then through the heating section, then through the holding mechanism, then through the cooling path of said regenerative section and then through the cooling section to a point of discharge; means for circulating fluid through the above defined course; diversion valve means interposed in the connection for conducting fluid from said holding mechanism to the cooling path of said regenerative section; means responsive to the temperature of fluid when discharged from said holding mechanism and controlling said valve means; and by-pass means communicating with said valve means whereby fluid discharged from the holding mechanism is by-passed and recirculated as fluid to be heated through the regenerative section when the temperature of such heated fluid is below the predetermined temperature; said by-pass means communicating with the atmosphere, whereby upon the diversion of fluid through said by-pass means gas within the by-pass means will escape into the atmosphere.

20. In a device of the class described for treating a fluid, a regenerative heating apparatus having a separate passage for the heated fluid and a separate passage for the fluid to be heated, means for supplying fluid to be heated to said regenerative apparatus, heating apparatus to which the fluid heated in said regenerative apparatus is supplied, holding apparatus to which the fluid heated in said heating apparatus is supplied, and diversion valve means controlled by the temperature of the heated fluid and communicating with said holding apparatus and with a by-pass whereby under-heated fluid is caused to be recirculated as fluid to be heated through the regenerative apparatus when the temperature of the under-heated fluid is below a predetermined temperature and is delivered to the regenerative apparatus as properly heated fluid to be cooled when the temperature thereof is equal to or greater than a predetermined temperature, said by-pass communicating with the atmosphere, whereby upon the diversion of fluid through said by-pass gas within said by-pass will be expelled into the atmosphere.

JAMES A. WILDERMUTH.